United States Patent [19]

Weiler et al.

[11] Patent Number: 4,501,410
[45] Date of Patent: Feb. 26, 1985

[54] VALVE BODY

[75] Inventors: Rolf Weiler, Frankfurt am Main; Reiner Müller, Hattersheim, both of Fed. Rep. of Germany

[73] Assignee: ITT Industries, Inc., New York, N.Y.

[21] Appl. No.: 550,547

[22] Filed: Nov. 10, 1983

[30] Foreign Application Priority Data

Nov. 15, 1982 [DE] Fed. Rep. of Germany ...... 3242188

[51] Int. Cl.³ .............................................. F15B 9/10
[52] U.S. Cl. .................................. 251/366; 91/369 R; 91/376 R
[58] Field of Search ............. 91/369 R, 369 A, 369 B, 91/376 R; 251/366

[56] References Cited

U.S. PATENT DOCUMENTS 4,164,198 8/1979 Tateoka ..................... 91/376 R
4,199,940 4/1980 Mathues et al. ............ 91/369 R
4,425,760 1/1984 Furuta ........................ 91/369 A

FOREIGN PATENT DOCUMENTS 2444622 4/1975 Fed. Rep. of Germany .... 91/369 B

Primary Examiner—A. Michael Chambers
Attorney, Agent, or Firm—James B. Raden; Edward J. Brosius

[57] ABSTRACT

An integral valve body of elastic material for use in the multiple function valve of a vacuum-operated brake power booster has two roughly circular cylindrical parts which are arranged one behind the other. Two annular portions of the valve body which succeed the cylindrical parts are formed to be particularly rigid. A bellows portion which forms a roll fold and interconnects the annular portions has an S-shaped longitudinal sectional profile in the longitudinal direction of the valve body, the profile being comparatively thin-walled.

6 Claims, 1 Drawing Figure

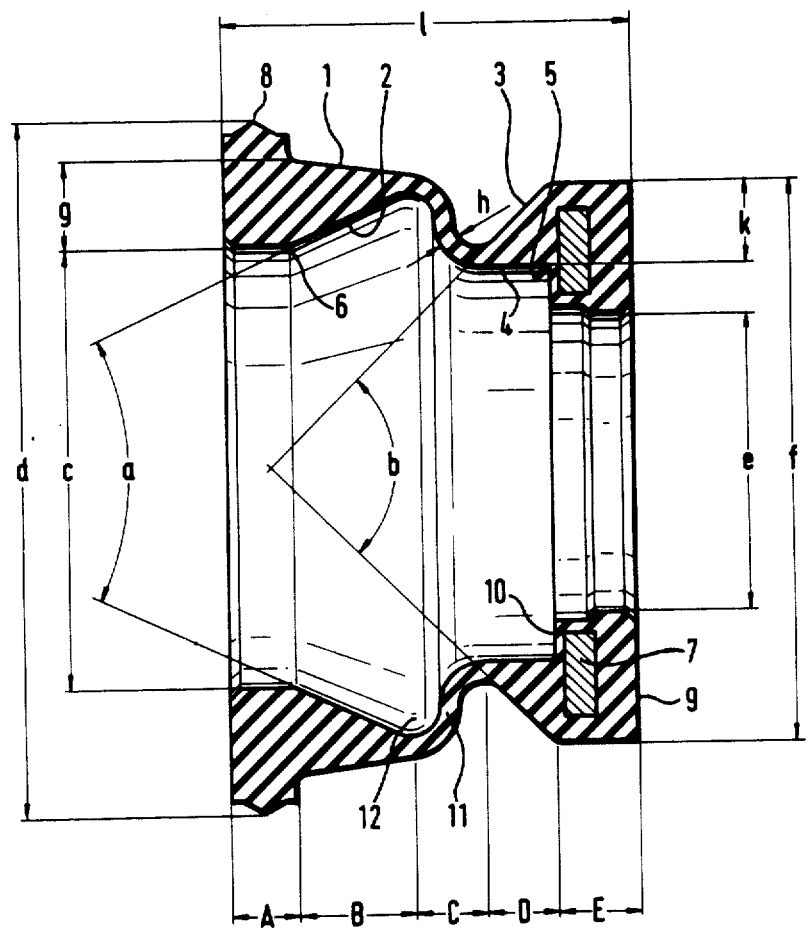

VALVE BODY

BACKGROUND OF THE INVENTION

The present invention is directed to a valve body of elastic material for use in the multiple function valve of a vacuum-operated brake power booster of the type in which the pedal-controlled operating rod slides a valve piston which controls the pressure in the booster chamber and cooperates with the valve body. The valve body comprises two roughly circular cylindrical parts with different diameters which are arranged one behind the other in axial direction and are formed in one piece with a bellows portion that interconnects both parts.

A vacuum-operated brake power booster is known from the German printed and published patent application No. 3047863. This booster is formed with a booster piston and a rod coupled with a brake pedal for operation of a double valve by which an operating chamber of the brake power booster is connectable selectably to under-pressure or to higher differential pressure. A first valve is formed by a valve seat at the booster piston and a sealing ring preloaded in the direction of the valve seat, and a second valve is formed by the same sealing ring and a valve portion which is connected with the rod.

The double valve (also called a multiple function valve or poppet valve) of the known brake power booster has the disadvantage during assembly of frequently not being capable of insertion in the valve housing exactly aligned with the operating rod, i.e. coaxially relative to that rod. Since the valve housing has a relatively low degree of stiffness, the center portion of the multiple function valve which has the shape of a corrugated tube or a bellows (roll fold) bends sideways and consequently fails to be seated on the pertaining valve seat in an unobjectionably tight manner. Even on correct mounting, the portion of the known multiple function valve forming the roll fold often spontaneously tucks in without control leading to the potential effect of premature wear.

SUMMARY OF THE INVENTION

A major object of the present invention is to create a valve body of the type referred to which is comparatively rigid with regard to lateral bending and which is formed with a roll fold that ensures a uniform tucking movement when the valve body is loaded in longitudinal direction. The valve body allows ease of assembly for which purpose the elements constituting one assembly, such as for example the valve springs, the valve piston and the piston rod, fastened to the one end of the valve body before final assembly can be held in the correct position relative to one another by the valve body when the assembly is being inserted into the control housing of the booster.

This major object is achieved according to the present invention in that the first part of larger diameter is succeeded in the direction of the second part of smaller diameter by an annular portion whose radially internally and externally extending peripheral surfaces are constituted by the generated surfaces of circular truncated cones. The internally extending generated surface forms an angle of opening of 44° to 56°, preferably of 50°, and the externally extending generated surface is slightly conically tapered in the direction of the second part. The external peripheral surface of the portion succeeding the second part is the generated surface of a circular truncated cone which forms an angle of opening of 80° to 100°, preferably of 90°. The radially internal peripheral surface of this portion is the surface of a cylinder and with the thin-walled bellows portion interconnects both said portions which have an S-shaped longitudinal sectional profile in the longitudinal direction of the valve body.

Preferably the thickness of the wall of the annular portion succeeding the first circular cylindrical part with peripheral surfaces constituted by the generated surfaces of circular truncated cones in the range of the transition from the first part to the succeeding portion corresponds to about four times the wall thickness of the bellows portion.

In order to achieve a high degree of stiffness of the valve body in the range of the second part which presents the sealing surface, the thickness of the wall of the annular portion succeeding the circular cylindrical second part with its peripheral surfaces constituted by the generated surface of a circular truncated cone and by the generated surface of a circular cylinder in the range of the transition from the second part of the succeeding portion corresponds to roughly four times the wall thickness of the bellow portion.

A particularly tight seat is achieved in that the second circular cylindrical part contains a stiffening ring of rigid material, for example of metal, which is embedded in the circular cylindrical part of elastic material and is surrounded by it on all sides.

The external peripheral surface of the first circular cylindrical part is advantageously formed with a circumferential radially outwardly projecting rib which ensures that a tight sealing between the control housing and the valve body is achievable.

The bellows portion with the S-shaped longitudinal sectional profile in the longitudinal direction of the valve body preferably has about the same length as the portion succeeding the second circular cylindrical part whose internal surface has a circular cylindrical shape and whose externally extending surface is formed as the generated surface of a circular truncated cone.

The invention allows for the most varied possibilities of embodiment, one of which is illustrated in the accompanying drawing that represents the longitudinal section through the valve body.

DETAILED DESCRIPTION

The valve body is formed as a homogeneous, axially symmetrical body of elastic material. As viewed in longitudinal direction (from left to right) it comprises five parts or portions A, B, C, D, E. The roughly circular cylindrical first portion A retains the valve body in the control housing of the booster (not illustrated) and is sealed off relative to the latter by the circumferential rib 8. The annular surface 10 serves as a support for the valve spring. The annular surface 9 at the second circular cylindrical portion E forms the sealing surface with which the valve body is seated on the respective tight seat in the control housing. A metal ring embedded within the valve body, designated 7, confers rigidity to the valve body in the range of the second circular cylindrical portion E. The configuration of the roll fold 11 as bellows portion C with S-shaped longitudinal sectional profile in the longitudinal direction of the valve body is of decisive importance for the rigidity of the valve body and for its high resistance to wear. When the valve body is compressed, i.e. on shortening of the total length 1, the roll fold 11, respectively the portion C, tucks into the part designated 12 of the internal space of the valve body. Due to their special sectional profiles, portions B and D remain completely rigid during compression so that only the comparitvely very thin-walled bellows portion C is subject to deformation.

During compression of the valve body in the longitudinal direction, the inner surface 2 and the peripheral surface 3 approach each other. The roll fold 11—that is exclusively the portion C—tucks in between surfaces 2 and 3 in the final phase of this action entirely filling in the space existing between the surfaces 2 and 3.

What is claimed is:

1. An integral valve body of elastic material adapted for use in the multiple function valve of a vacuum-operated brake power booster, the pedal-controlled operating rod of which makes a valve piston which controls the pressure in the booster chamber slide and cooperates with the valve body, said valve body comprising two roughly circular cylindrical parts with different inner and outer diameters which are arranged one behind the other in the axial direction and are formed in one piece with a bellows portion that interconnects both parts, the invention in which a first of said parts of larger diameter is succeeded in the direction of the second part of smaller diameter by an annular portion whose radially internally and externally extending peripheral surfaces are constituted by the generated surfaces of circular truncated cones, with the internally extending generated surface forming an angle of opening of between 44° to 56°, and the externally extending generated surface being slightly conically tapered in the direction of the second part and the external peripheral surface of the portion succeeding the second part being the generated surface of a circular truncated cone which forms an angle of opening of between 80° to 100°, while the radially internal peripheral surface of this portion is the surface of a cylinder and in which the thin-walled bellows portion which interconnects both said portions has an S-shaped longitudinal sectional profile in the longitudinal direction of the valve body.

2. A valve body as claimed in claim 1, in which the thickness of the wall of the annular portion succeeding the first circular cylindrical part with peripheral surfaces constituted by the generated surfaces of circular truncated cones in the range of the transition from the first part to the succeeding portion corresponds to about four times the wall thickness of the bellows portion.

3. A valve body as claimed in claim 1, which the thickness of the wall of the annular portion succeeding the circular cylindrical second part with its peripheral surfaces constituted by the generated surface of a circular truncated cone and by the generated surface of a circular cylinder in the range of the transition from the second part to the succeeding portion corresponds to roughly four times the wall thickness of the bellow portion.

4. A valve body as claimed in claim 1 in which the second circular cylindrical part contains a stiffening ring of rigid material, for example a metal, which is embedded in the circular cylindrical part of elastic material and is surrounded by it on all sides.

5. A valve body as claimed in claim 1 in which the external peripheral surface of the first circular cylindrical part is formed with a circumferential radially outwardly projecting rib.

6. A valve body as claimed in claim 1 in which the bellows portion which has an S-shaped longitudinal sectional profile in the longitudinal direction of the valve body has about the same length as the portion succeeding the second circular cylindrical part whose internal surface has a circular cylindrical shape and whose externally extending surface is formed as the generated surface of a circular truncated cone.

* * * * *